(12) United States Patent
Wada

(10) Patent No.: US 11,940,532 B1
(45) Date of Patent: Mar. 26, 2024

(54) FISH FINDER SYSTEM AND METHOD

(71) Applicant: Furuno Electric Co., Ltd., Hyogo (JP)

(72) Inventor: Tomoo Wada, Ashiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 30 days.

(21) Appl. No.: 17/939,269

(22) Filed: Sep. 7, 2022

(51) Int. Cl.
  G01S 15/96 (2006.01)
  G01S 7/56 (2006.01)

(52) U.S. Cl.
  CPC ............... *G01S 15/96* (2013.01); *G01S 7/56* (2013.01)

(58) Field of Classification Search
  None
  See application file for complete search history.

(56) References Cited

U.S. PATENT DOCUMENTS

| | | | | |
|---|---|---|---|---|
| 5,186,428 | A * | 2/1993 | Falkenberg | G10K 11/006 367/173 |
| 6,595,315 | B1 * | 7/2003 | Fujimoto | G01S 7/64 367/111 |
| 7,161,872 | B2 * | 1/2007 | Kuriyama | A01K 89/015 367/111 |
| 7,289,390 | B2 * | 10/2007 | Nishimori | G01S 15/107 367/105 |
| 9,135,731 | B2 | 9/2015 | Lauenstein et al. | |
| 2005/0162976 | A1 * | 7/2005 | Kuriyama | A01K 89/00 367/111 |
| 2006/0013066 | A1 * | 1/2006 | Nishimori | G01S 15/96 367/88 |
| 2021/0190970 | A1 * | 6/2021 | Edwards | H04B 17/318 |
| 2021/0406128 | A1 * | 12/2021 | Wiley | G01S 15/96 |
| 2023/0017931 | A1 * | 1/2023 | Ueshina | G01C 21/203 |

FOREIGN PATENT DOCUMENTS

JP  2904850 B2  6/1999

* cited by examiner

*Primary Examiner* — Isam A Alsomiri
*Assistant Examiner* — Jonathan D Armstrong
(74) *Attorney, Agent, or Firm* — Alleman Hall & Tuttle LLP

(57) ABSTRACT

A fish finder system is provided with a capture device information input terminal configured to input a capture device information, a capture device dropping point input terminal configured to input a dropping point at which a capture device is dropped, a tidal current input terminal configured to input tidal current information including a tidal current direction and a tidal current speed, and processing circuitry communicatively coupled to the capture device information input terminal, the capture device dropping point input terminal, and the tidal current input terminal. The processing circuitry is configured to calculate a drift amount of the capture device relative to the dropping point and calculate a capture device arrival point at which the capture device arrives in the water.

21 Claims, 15 Drawing Sheets

| Depth (m) | Area 1 | Area 2 | Area 3 | Area 4 | Area 5 | ... | Relative drift (m) | Absolute reaching position |
|---|---|---|---|---|---|---|---|---|
|  | N:7.5 W:1.5 | N:6.5 W:1.2 | N:5.8 W:1.3 | N:6.2 W:1.8 | N:6.3 W:1.9 | N:7.2 W:2.1 | N:16.2 W:12.5 |  |
| 9 – 16 | N:8.5 W:0.3 | N:6.1 W:0.4 | N:7.3 W:0.6 | N:7.1 W:0.7 | N:8.2 W:0.5 | N:6.0 W:0.8 | N:20.8 W:16.6 |  |
| 17 – 24 | N:3.4 E:2.0 | N:3.5 E:2.2 | N:4.1 E:2.1 | N:4.5 E:1.8 | N:4.8 E:2.1 | N:5.7 E:2.3 | N:14.3 E:12.8 |  |
| 25 – 32 | S:5.5 E:3.4 | S:5.8 E:3.2 | S:6.2 E:3.4 | S:6.1 E:3.5 | S:6.7 E:3.1 | S:7.4 E:3.2 | S:23.2 E:12.4 |  |
| 33 – | S:2.1 W:1.2 | S:2.1 W:1.3 | S:1.9 W:1.4 | S:2.1 W:1.0 | S:2.4 W:1.2 | S:2.3 W:1.1 | S:5.0 W:13.2 |  |
| Final |  |  |  |  |  |  | N:32.1 W16:3 | North Latitude: East Longitude: |

FIG. 10B

FISH FINDER SYSTEM AND METHOD

TECHNICAL FIELD

The present invention relates to a fish finder system and a method for detecting tidal drift of a capture device.

BACKGROUND

Tidal current detection is a technique to measure speed and direction of tides for fishing and navigation of ships. Tidal currents are measured with a tide meter for the purpose of fishing assistance and marine research. The tide meter is installed to the bottom of a ship and includes a transducer that transmits and receives ultrasonic waves at a certain depression angle with respect to directions that are generally 120 degrees apart from each other in a horizontal direction. With this configuration, the tide meter allows the ship's velocity, relative to the tidal current, from a Doppler shift frequency generated in reflected waves, against water echoes, resulting from countless scatters in the sea located at the set depth. Further, the tide meter determines the speed of a ground speed of the ship with respect to the sea floor from the Doppler shift frequency generated in the reflected wave or ground echo, from the sea floor. Also, the tide meter determines the tidal current speed from the difference between the ground speed and the speed of water.

Measurement of tidal current and tidal drift is an important aspect for fundamental parameters for the fishing, apart from transducers for detecting fish schools. The measurement of the tidal current and the tidal drift may help to detect position of a dropping area of a dropping point of a tackle or a fishing device. Presently, the tide meter is used to determine the speed of the tide or waves relative to the ship. The tide meter is provided with the transducer to transmit ultrasonic waves into water and receive the reflected waves. Further, the received waves are used to derive the Doppler shift frequency of the reflected waves to determine speed and direction of tides with respect to the ship. Further, the speed and direction of the tides is continuously changing with direction of ship, and therefore, it is not possible to determine accurate tidal current, for dropping the fishing device.

In view of these problems, it is an object of the present invention to provide a system and a method capable of accurately measuring tidal currents in each layer of ocean water.

SUMMARY

The present invention discloses a fish finder system, a fish finder method, and a non-transitory computer readable medium to predict a shape and a state of a fishing line, a rope, or a like to be hung in water by measuring tidal current in each layer of ocean water. A first aspect of present invention relates to a fish finder system configured to calculate an arrival point based on a dropping point and a drift amount. The fish finder system, according to the first aspect, is provided with a capture device information input terminal, a capture device dropping point input terminal, a tidal current input terminal, and processing circuitry. The capture device information input terminal is configured to input a capture device information. The capture device dropping point input terminal is configured to input a dropping point at which a capture device is dropped from a water surface. The tidal current input terminal is configured to input tidal current information including a tidal current direction and a tidal current speed. The area of the tidal current includes the dropping point. The processing circuitry communicatively coupled to the capture device information input terminal, the capture device dropping point input terminal, and the tidal current input terminal, is configured to calculate a drift amount of the capture device relative to the dropping point, based at least on the capture device information and the tidal current information. Further, the processing circuitry is configured to calculate a capture device arrival point at which the capture device arrives in the water, based at least on the dropping point and the drift amount. Thus, the data related to the capture device arrival point data may be obtained and may be displayed on a display device.

A second aspect of present invention relates to a fish finder system configured to calculate a dropping point based on a target point and drift amount. The fish finder system, according to the first aspect, is provided with a capture device information input terminal, a capture device dropping point input terminal, a tidal current input terminal, and processing circuitry. The capture device information input terminal is configured to input a capture device information. The capture device target point input terminal configured to be inputted the target point at which a capture device is expected to reach in the water. The tidal current input terminal configured to input the tidal current information including a tidal current direction and a tidal current speed. The area of the tidal current includes the target point. The processing circuitry is configured to calculate a drift amount of the capture device required to reach the dropping point, based on the capture device information and the tidal current information and, a capture device dropping point at which the capture device drops in the water, based on the target point and the required drift amount. Thus, the capture device dropping point data may be obtained and may be displayed on the display device.

BRIEF DESCRIPTION OF THE DRAWINGS

FIG. 10B is a table showing a direction and velocity of the tidal current for each area and depth in the vicinity of the ship, according to an embodiment of the present invention;

DETAILED DESCRIPTION

Figure 1B:
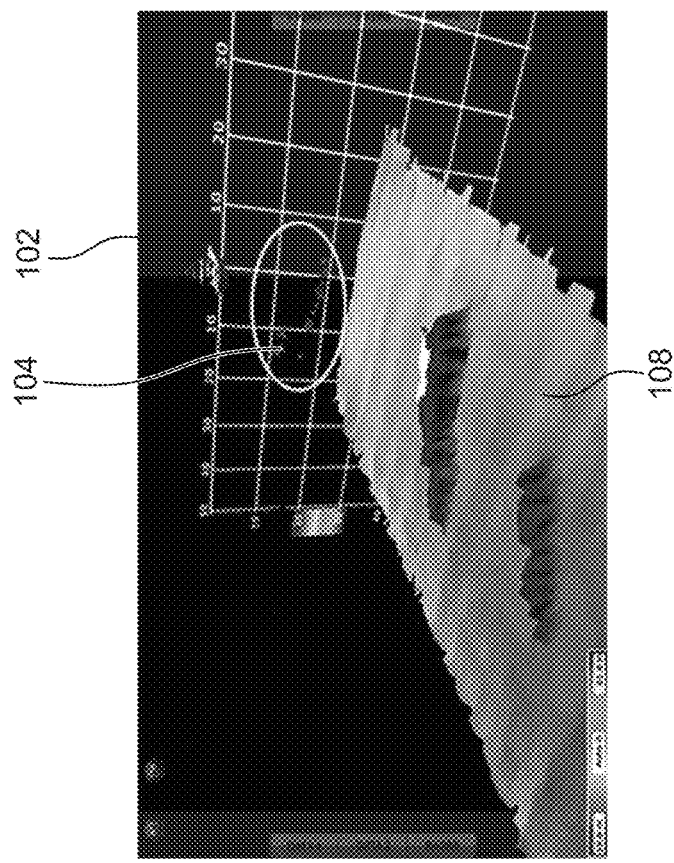
FIG. 1B shows a simulated graph of the tidal drift detection and fish school by the fish finder system, according to an embodiment of the present invention.

Embodiments of the present invention will be described below with reference to the drawings. The same reference numerals are given to the same or corresponding parts in the figure, and the description thereof will not be repeated. At least some of the embodiments described below may be arbitrarily combined.

A fish finder system helps in detecting a fish school and provides information about underwater objects by transmitting ultrasound waves into the sea and receiving the reflection echoes. A part of the transmitted ultrasonic wave reflects to the source when encountering underwater objects or other obstructions. The fish finder system processes the reflected ultrasound waves to extract the underwater information.

The ultrasound waves from the fish finder system are transmitted directly underneath a ship. The received echoes are converted into an electrical signal, amplified, and processed to be displayed on a screen. By measuring time elapsed between transmission and reception of the ultrasound wave, the depth of the underwater object is calculated and displayed on the screen according to the strength of its echo.

Further, a fish school of high density or rocks on the seabed return strong echoes and the fish school of low density or small fish may be displayed on the screen. It may be noted that echoes are displayed on the screen against time.

An aspect of the present invention is a tidal current indicator that helps in detection of tidal current at different depth of the ocean. There are various presentation modes present on the tidal current indicator such as tide vector, ship speed, echo level, text, track, and tide log. The tidal current direction for multiple depth layers may be displayed with vectors. The depth of each layer may be set manually in predefined intervals. Further, a tide differential between a reference and other layers, heading and course may also be displayed in large text.

Figure 1A:
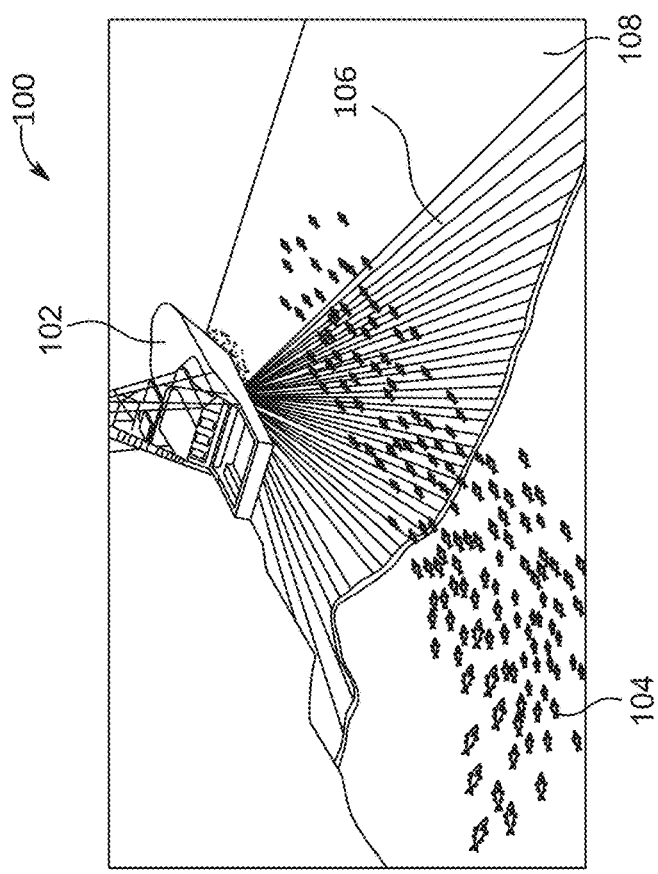
FIG. 1A shows an example of a tidal drift detection by a fish finder system, according to an embodiment of the present invention.

FIG. 1A shows an example of a tidal drift detection by a fish finder system 100, according to an embodiment of the present invention. FIG. 1B shows a simulated graph of the tidal drift detection and fish school by the fish finder system, according to an embodiment of the present invention.

Referring to FIG. 1A, the fish finder system 100 may be installed on a ship 102 to detect a fish school 104. The fish finder system 100 may comprise a fish finder transducer 106 disposed at a bottom surface of the ship 102 in any configuration suitable for detection of a fish school 104.

The fish finder transducer 106 may transmit ultrasound waves onto ocean floor and receive reflected waves from aquatic objects inside the water. The reflected waves may also be referred to as echoes.

The fish finder transducer 106 may be a network multi-beam sound navigation and ranging (SONAR), such as DFF-3D, that may instantly scan a wide range of angles from left to right. The network multi-beam sonar may scan 120 degrees to the left and right. Further, the fish finder transducer 106 may draw a detailed topographic structure of seabed in a three-dimensional (3D), as shown in FIG. 1B. The fish finder transducer 106 may also show a positional relationship of the fish school 104.

The fish finder transducer 106 may be useful to target deep environments, as it may draw the ocean floor 108 at a greater depth and width to provide more practical 3D information. For example, approximately 200 meters of depth and 120 degrees of width. The fish finder transducer 106 may be equipped with modes such as a single beam display that projects up to about 300 meters, and a side scan display that explores the shape of the seabed from both sides of the ship 102. The fish finder transducer 106 may be equipped with a motion sensor to provide stable images even in the presence of strong turbulence.

The fish finder system 100 may be configured to display the 3D information on a display device (not shown). Further, the display device may display sea level, and sea bottom with the fish school 104 in between. It may be noted that display of sea level, sea bottom and the fish school 104 may vary in shape, concentration, hue, and distribution, based on the 3D information.

Further, in a 3D history screen mode of the display device (not shown), one or more 3D images may be shown with excellent visibility, to understand the relationship between the bottom topography and the fish school 104. The 3D history screen mode is suitable for selecting fishing points and grasping changes in the shape of the ocean floor 108.

Figure 2:
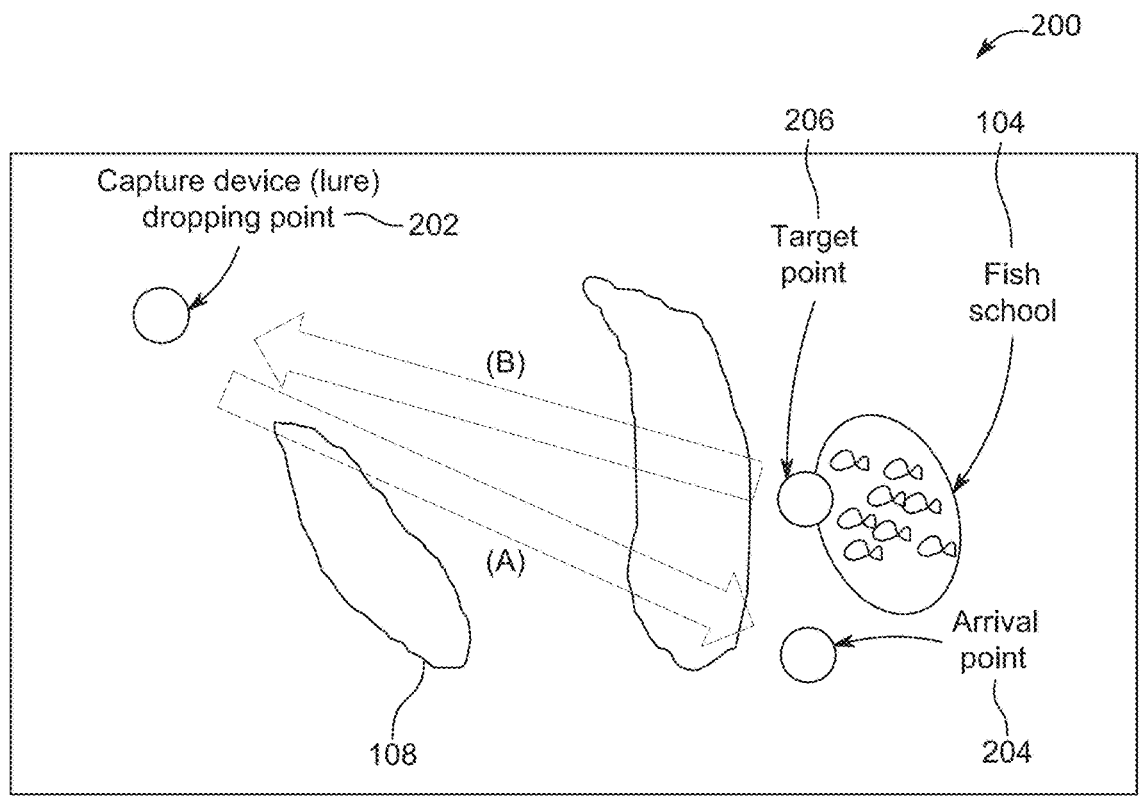
FIG. 2 is a display device of the fish finder system showing a dropping point, an arrival point and a target point of a capture device, according to an embodiment of the present invention.

FIG. 2 is a display device 200 of the fish finder system 100 showing a dropping point 202, an arrival point 204, and a target point 206 of a capture device (not shown), according to an embodiment of the present invention.

The dropping point 202 may be defined as a point over a water surface where a capture device (not shown) is to be thrown, the arrival point 204 may be defined as the final location over the ocean floor 108 where the capture device stops after drifting and the target point 206 may be defined as the point where the capture device is targeted to stop within the ocean.

Referring to FIG. 2, the display device 200 shows a two-dimensional (2D) image scanned by the fish finder transducer 106 from an area around the ship 102. The display device 200 may be, but not limited to, a screen, a smart screen, a touch screen, or a monitor.

In the first aspect, the fish finder system 100 may be configured to obtain the arrival point 204 by the selection of the dropping point 202 for the capture device. It may be noted that the arrival point 204 of the capture device in the water is calculated when the dropping point 202 of the capture device is entered. Further, the arrival point 204 may be calculated by considering various factors such as, but are not limited to, weight of the capture device, size of the capture device, length of harness for the capture device and the tidal current at different layers of water.

In the second aspect, the fish finder system 100 may be configured to obtain the dropping point 202 by the selection of the target point 206 for the capture device. It may be noted that the dropping point of the capture device may be calculated backwards and displayed on the display device when a predetermined position in the sea is entered. The predetermined position in the sea corresponds to a position where a fish school 104 is located. It may also be noted that the dropping point 202 may be calculated by considering various factors such as, but is noted limited to, the weight of the capture device, the size of the capture device, the length of harness for the capture device and tidal current at different layers of water.

In both the aspect of present invention, the calculated dropping point 202 and the arrival point 204 may be predictive on the bases of various factors, as mentioned above.

Figure 3:
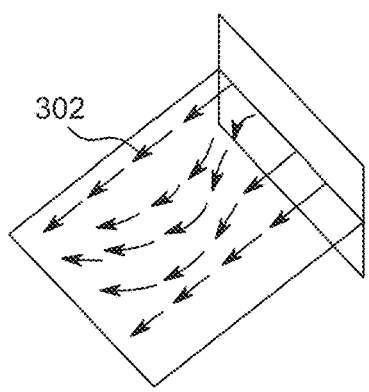
FIG. 3 shows a tidal current data obtained from a fish finder transducer to visualize the dropping point, according to an embodiment of the present invention.
Figure 3:
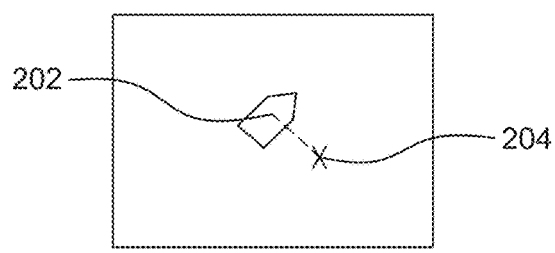

FIG. 3 shows a tidal current data obtained from the fish finder transducer 106 to visualize the dropping point 202, according to an embodiment of the present invention.

The fish finder transducer 106 transmits a wide ultrasonic beam onto the ocean floor 108. Further, the fish finder transducer 106 switches to a reception mode, to create a multitude of narrow reception beams pointing in different depths around the ship 102 to acquire echoes coming from these depths. The reception beams may provide a distance and strength of echoes at a particular depth and a tidal current 302 image may be constructed from the information provided by the reception beams.

The fish finder transducer 106 may comprise a plurality of transducer elements (not shown) to create multiple beams. It may be noted that the multiple beams are formed by performing beamforming. The beamforming is performed by controlling phase and weight of the signals received by the plurality of transducer elements.

Figure 4:
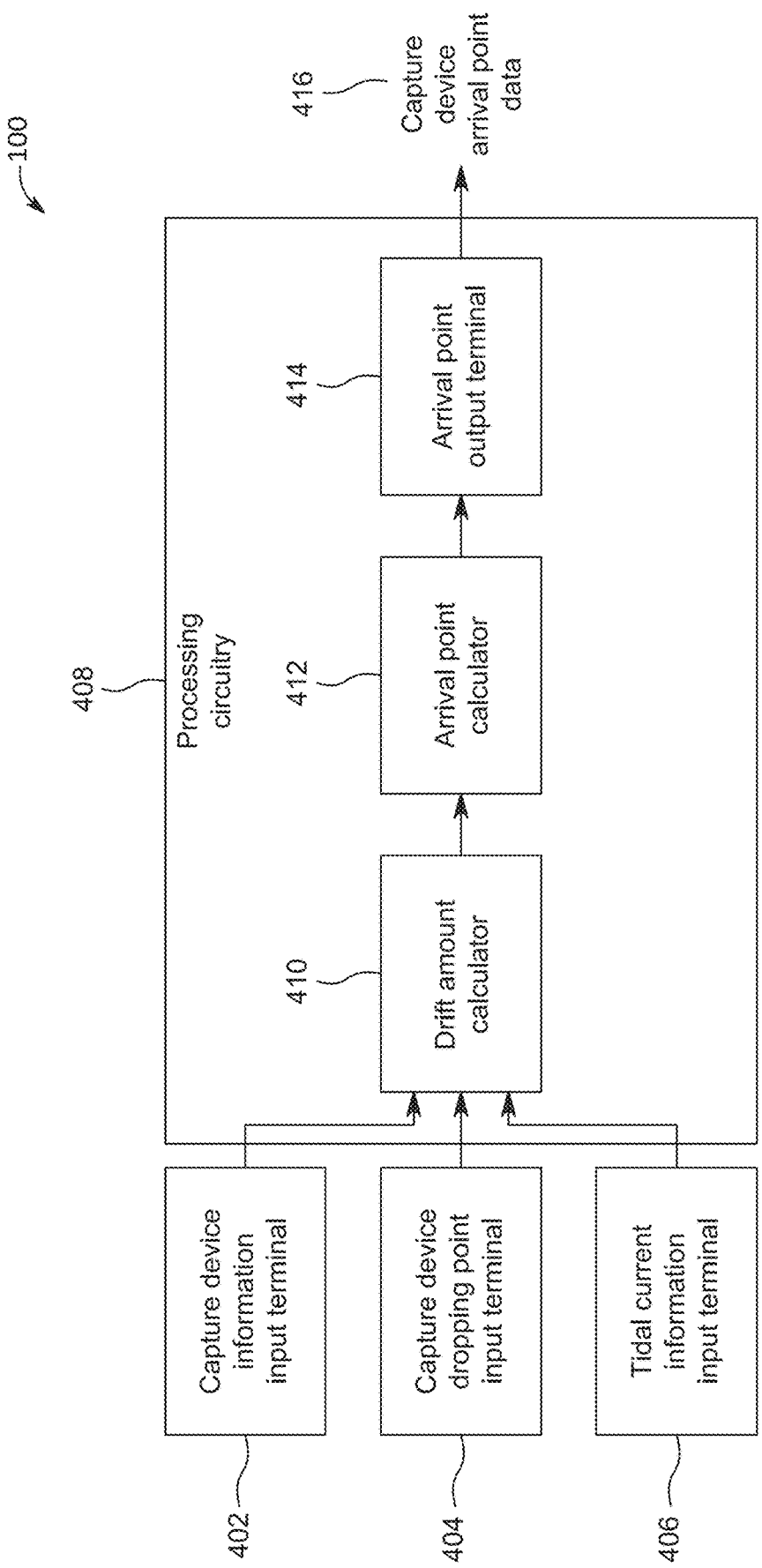
FIG. 4 is a block diagram for calculating an arrival point of the capture device, according to a first aspect of the present invention.

FIG. 4 is a block diagram for finding the arrival point 204 of the capture device, according to a first aspect of the present invention.

According to the first aspect of the present invention, the fish finder system 100 may comprise a capture device information input terminal 402, a capture device dropping point input terminal 404, a tidal current information input terminal 406, and a processing circuitry 408. The processing circuitry 408 may comprise a drift amount calculator 410, an arrival point calculator 412, and an arrival point output terminal 414. Further, the fish finder system 100 may comprise a capture device arrival point data 416.

It may be noted that the capture device information input terminal 402 may be configured to input a capture device information. The capture device information comprises one or more parameters such as, but not limited to, the size and the weight of the capture device. The capture device dropping point input terminal 404 may be configured to input the dropping point 202 at which the capture device is dropped from the water surface. The tidal current input terminal 406 may be configured to input tidal current information including the tidal current 302 directions and the tidal current 302 speed. It may be noted that area of the tidal current 302 includes the dropping point 202.

The processing circuitry 408 may be communicatively coupled to the capture device information input terminal 402, the capture device dropping point input terminal 404, and a tidal current information input terminal 406. The processing circuitry 408 may be configured to calculate a drift amount of the capture device relative to the dropping point 202, based on the capture device information and the tidal current information, and calculate a capture device arrival point at which the capture device arrives in the water, based on the dropping point 202 and the drift amount. Thus, the capture device arrival point data 416 may be obtained and displayed on the display device.

Figure 5A:
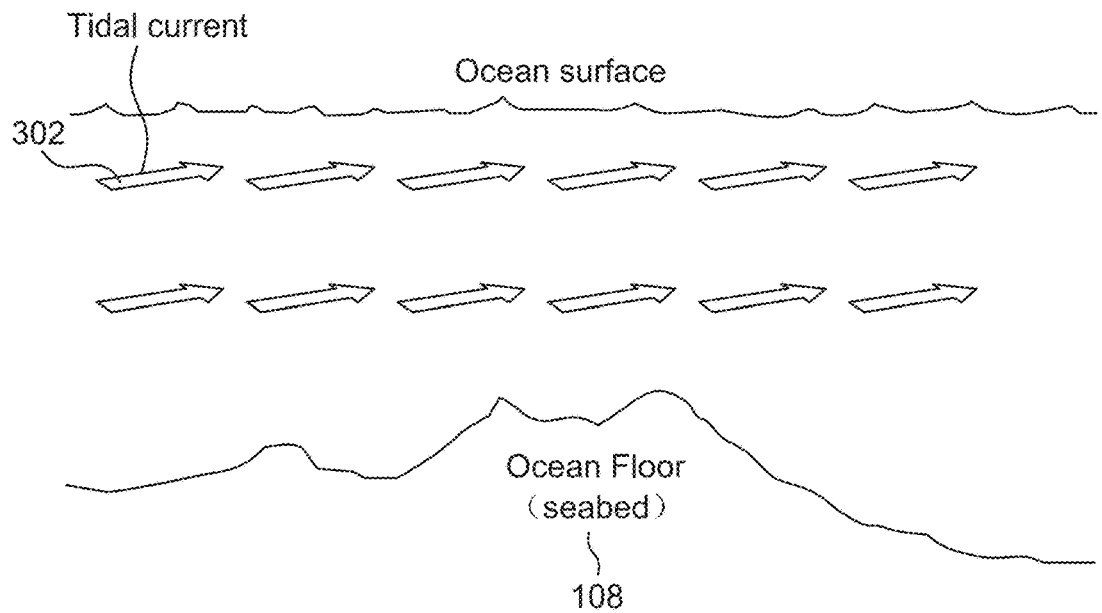
FIG. 5A is an image of the ocean and the tidal current, according to the first aspect of the present invention.

FIG. 5A is an image of the ocean and the tidal current 302, according to the first aspect of the present invention.

Referring to the FIG. 5A, the flow of the tidal current 302 in one direction at every depth of the ocean is shown. The tidal current 302 may be measured to the depth just above the ocean floor 108 or seabed. Further, the tidal current 302 may vary near the ocean floor 108 due to uneven surface or rocks present on the ocean floor 108.

Figure 5B:
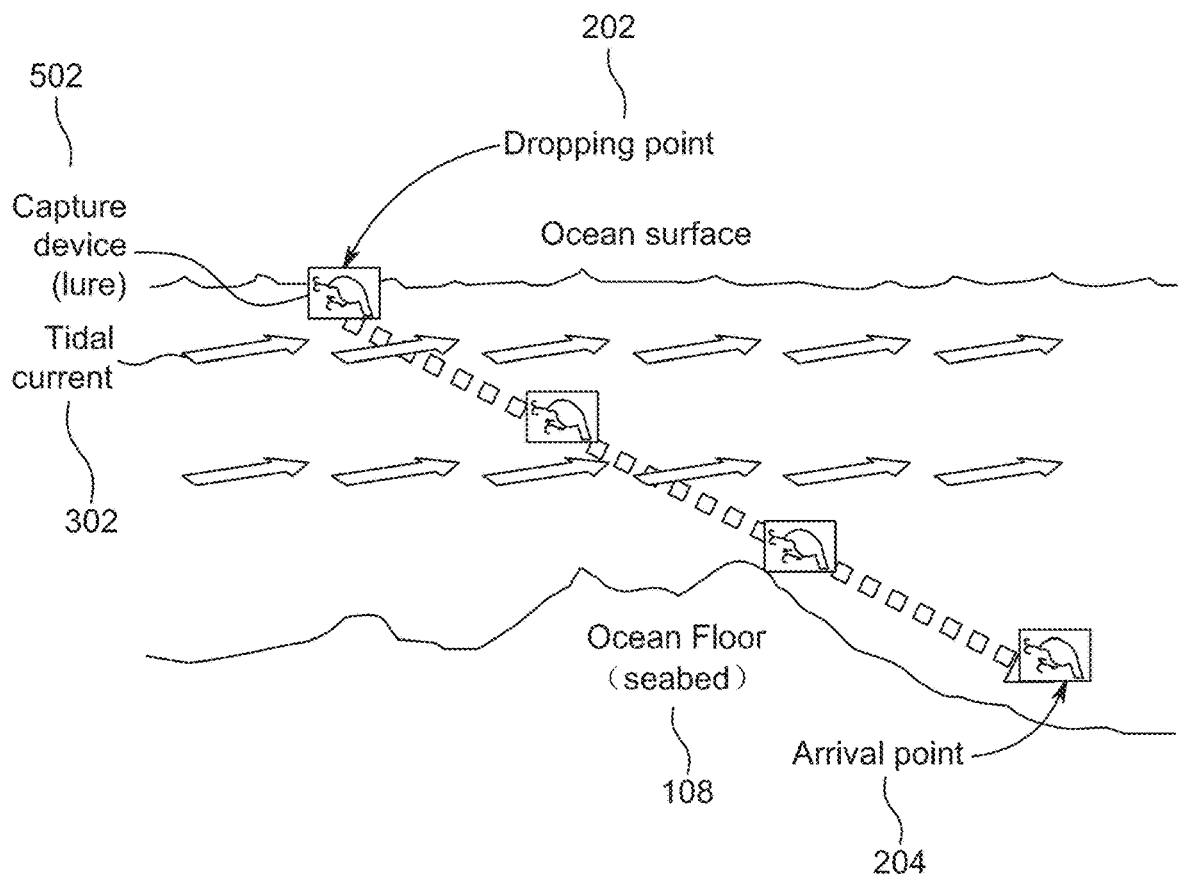
FIG. 5B is an image of the ocean and the tidal current with the capture device, according to the first aspect of the present invention.

FIG. 5B is an image of the ocean and the tidal current 302 with a capture device 502, according to the first aspect of the present invention.

According to the first aspect of the present invention, the capture device 502 is dropped from the dropping point 202 based at least on the calculation obtained by the fish finder system 100. The capture device 502 may be configured to transmit the position at every depth until the capture device 502 the reaches the arrival point 204. The capture device 502 may be referred to as a lure or fish tackling device.

Figure 6:
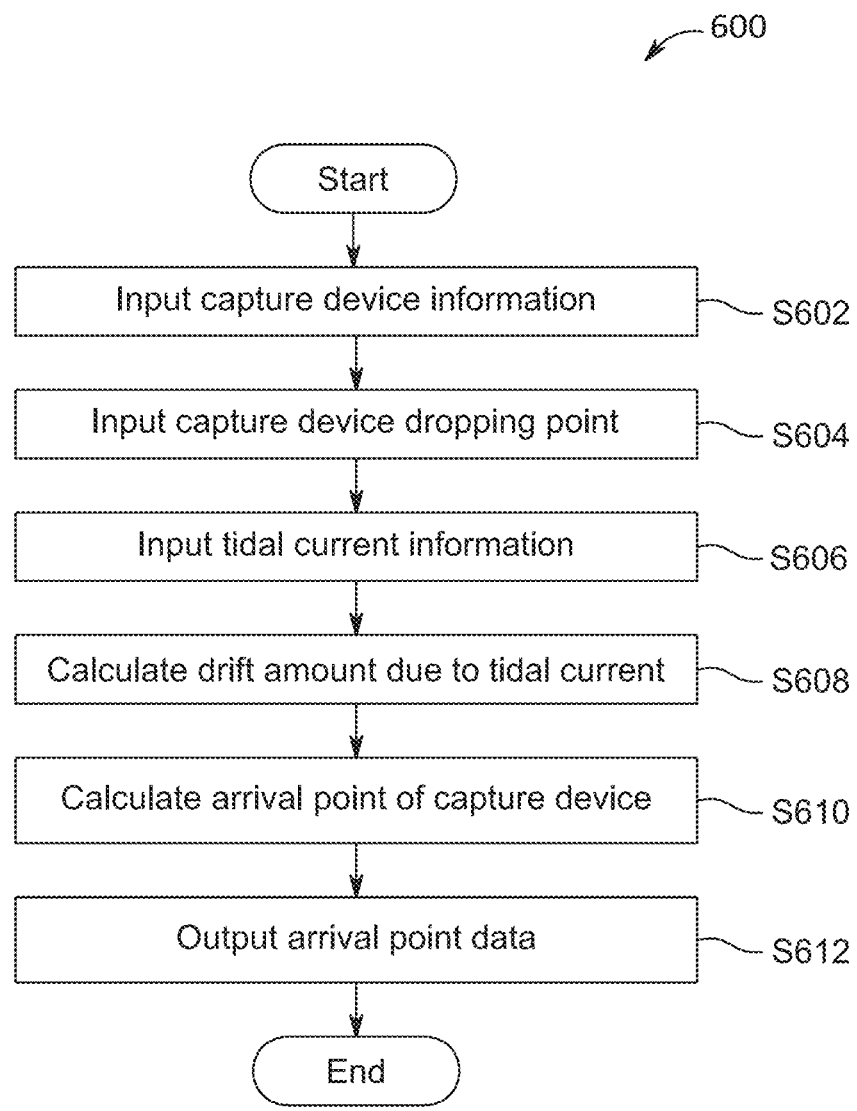
FIG. 6 is a flowchart of a method for calculating the arrival point of the capture device, according to the first aspect of the present invention.

FIG. 6 is a flowchart 600 of a method for finding the arrival point 204 with the fish finder system 100, according to the first aspect of the present invention.

At first, the capture device information input terminal 402 is input with the capture device information, at step S602. For example, the size of the capture device 502 is entered as L*W*H as 70*70*32 centimeters (cm), the weight of the capture device 502 is entered as 206 grams and the fishing line length (L) as 10 meters.

Successively, the dropping point 202 at which the capture device 502 is dropped from the water surface, is input to the capture device dropping point input terminal 404, at step S604. For example, the dropping point 202 entered by the user is 38.84° N, 135.00° E.

Further, the tidal current information including the tidal current 302 directions and the tidal current 302 speed is to the tidal current information input terminal 406, at step S606. For example, the tidal current 302 direction is entered as "south-west" and the speed is entered as 1.5 m/s.

Further, the drift amount of the capture device 502 is calculated relative to the dropping point 202, based on the capture device information and the tidal current information, at step S608. For example, the drift amount of capture device 502 is calculated as 5 m/s from the dropping point 202 location based on size as 70*70*32 (cm), weight as 206 grams, fishing line length as 10 (m) and direction and speed of the tidal current as "south-west" and 1.5 m/s respectively.

Successively, the capture device arrival point at which the capture device 502 arrives in the water is calculated, based on the dropping point 202 and the drift amount, at step S610. For example, the arrival point 204 of the capture device 502 is 39.12° N, 134.29° E.

Further, the capture device arrival point data 416 is obtained, at step S612. It may be noted that the capture device arrival point data 416 is displayed onto the display device. For example, the display device may show the arrival point 204 as "39.88° N, 135.70° E".

Figure 7:
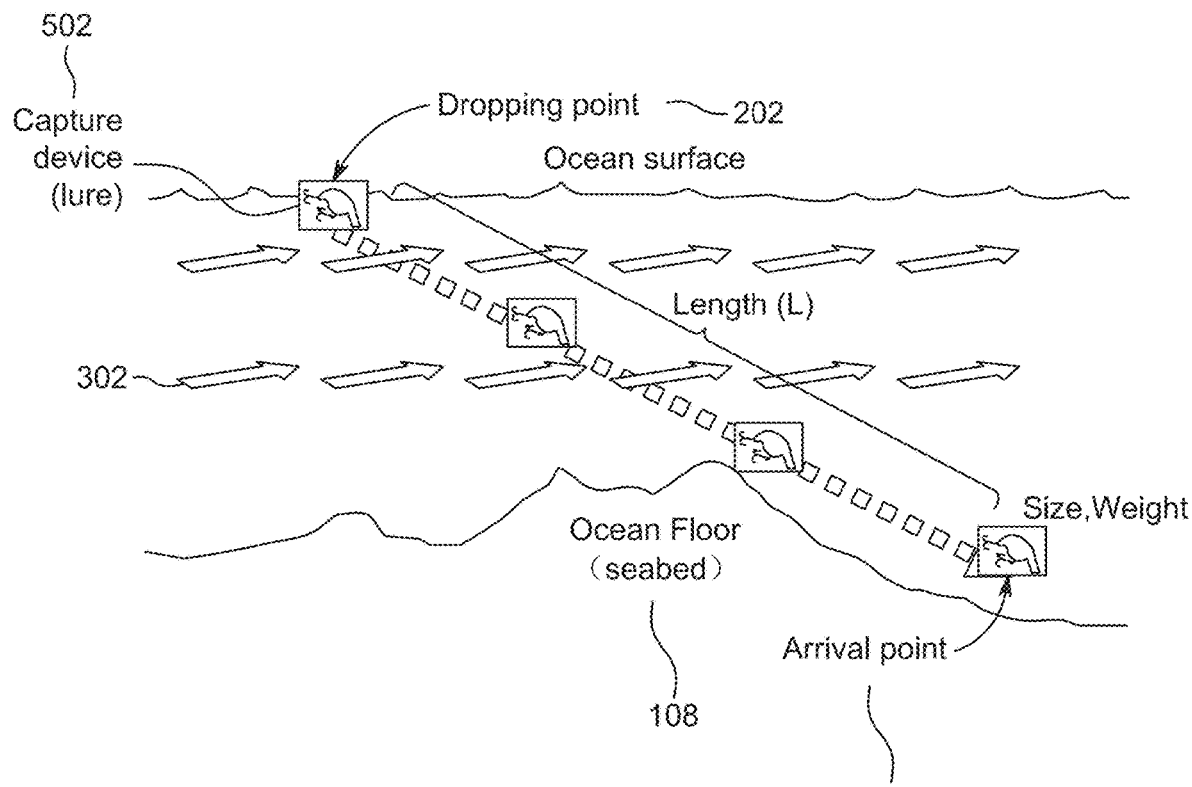
FIG. 7 is an image of the ocean and the tidal current with the capture device size, weight and length, according to an embodiment of the present invention.

FIG. 7 is an image of the ocean and the tidal current 302 with the capture device 502 size, weight, and length (L), according to the first aspect of the present invention.

According to the first aspect of present invention, the capture device 502 is dropped from the dropping point 202 based on the calculation obtained by the fish finder system 100. The length (L) required for the capture device 502 to reach the arrival point 204 may be calculated based on the size and the weight of the capture device 502, when the flow of tidal current 302 in one direction at all the depth of the ocean is shown in FIG. 7.

The capture device 502 may be the fishing tackle, a fishing needle, or the lure.

The capture device 502 is configured to transmit the capture device information that includes the size of the capture device 502, the weight of the capture device 502 and the fishing line length (L) from the dropping point 202 to a tip of the fishing line to which the capture device 502 is attached in the water.

Further, the fish finder system 100 is configured to calculate the drift amount within reach of the tip, based on the size and weight of the capture device 502 and the tidal current information.

Figure 8:
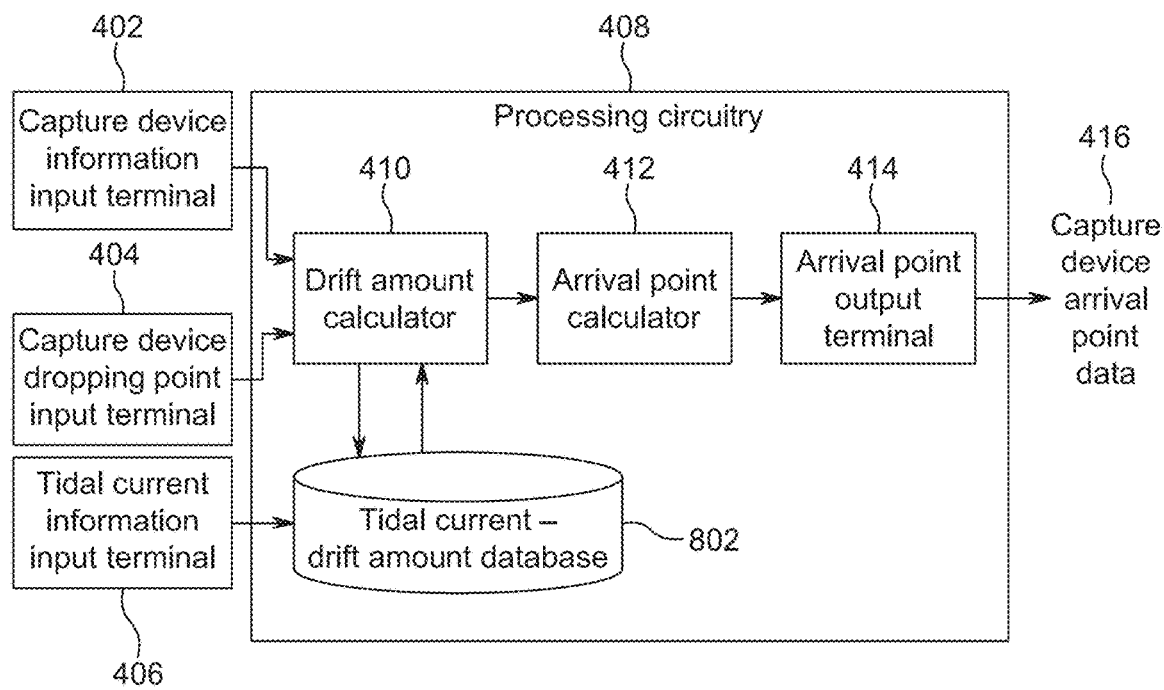
FIG. 8 is a block diagram of the fish finder system with a tidal current—drift amount database, according to an embodiment of the present invention.

FIG. 8 is a block diagram of the fish finder system 100 with a tidal current—drift amount database 802, according to an embodiment of the present invention.

Referring to the FIG. 8, the fish finder system 100 may comprise the capture device information input terminal 402, the capture device dropping point input terminal 404, the tidal current information input terminal 406, and the processing circuitry 408. The processing circuitry 408 may include the drift amount calculator 410, the arrival point calculator 412, the arrival point output terminal 414, and a tidal current-drift amount database 802. Further, the fish finder system 100 may comprise the capture device arrival point data 416.

The capture device information input terminal 402 may be configured to input the capture device information. The capture device dropping point input terminal 404 may be configured to input the dropping point 202 at which the capture device 502 is dropped from the water surface.

The tidal current information input terminal 406 is configured to input tidal current information including the tidal current 302 directions and the tidal current 302 speed. The processing circuitry 408 is configured to calculate a drift amount of the capture device 502 relative to the dropping point 202, based on the capture device information and the tidal current information, and calculate the capture device arrival point at which the capture device 502 arrives in the water, based on the dropping point 202 and the drift amount.

The processing circuitry 408 is configured to includes the tidal current-drift amount database 802. The tidal current-drift amount database 802 stores the drift amount by which the capture device 502 drifts in accordance with the tidal current information, and according to the size and weight of the capture device 502, while the capture device 502 sinks to a predetermined depth. The processing circuitry 408 may determine the drift amount for each layer, by the inputted capture device information and the inputted tidal current information for the layer with the information stored in the tidal current-drift amount database 802.

For the calculation of the drift amount in each layer, the tidal current-drift amount database 802 stores data related to size and weight of the capture device 502. It may be noted that the size and weight of the capture device 502 indicates how far the capture device 502 is drifted by the tidal current 302 while the capture device 502 sinks to a predetermined depth. Then, the drift amount may be determined by matching the inputted information on the capture device 502 and the tidal current information with the information in the tidal current-drift amount database 802.

Figure 9A:
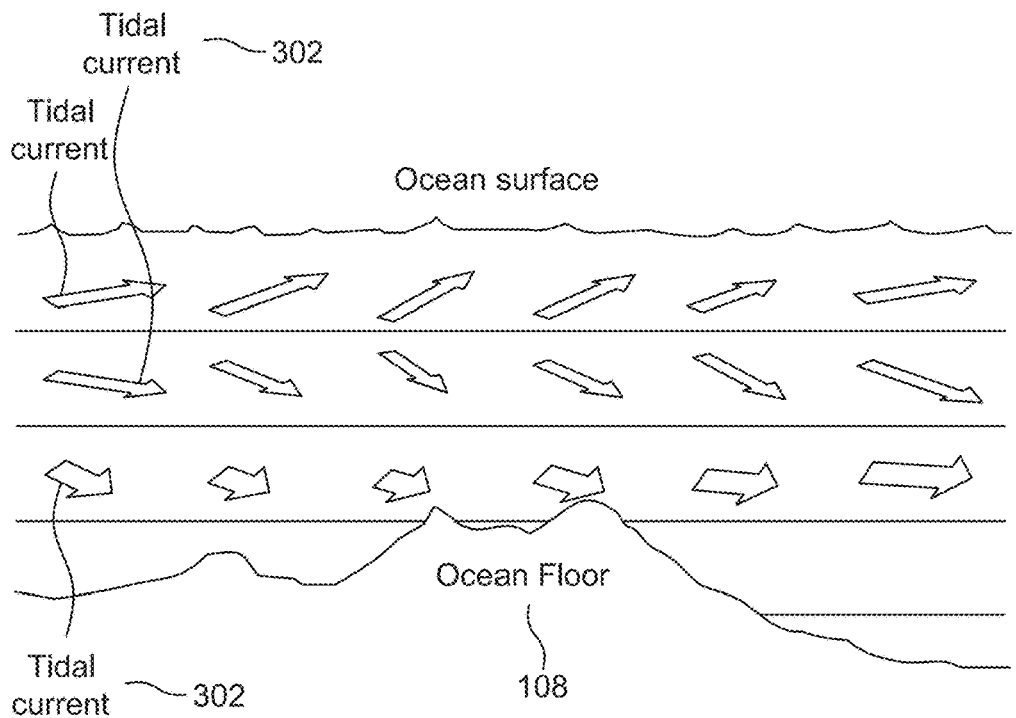
FIG. 9A is an image of the ocean and multiple tidal current layers, according to an embodiment of the present invention.

FIG. 9A is an image of the ocean and the multiple tidal current layers, according to an embodiment of the present invention.

Referring to the FIG. 9A, the flow of tidal current 302 in different direction is shown at different depth of the ocean. For example, the tidal current 302 may bend harness in different direction due to the movement of tidal current 302 that may require extra harness to reach the arrival point 204.

Figure 9B:
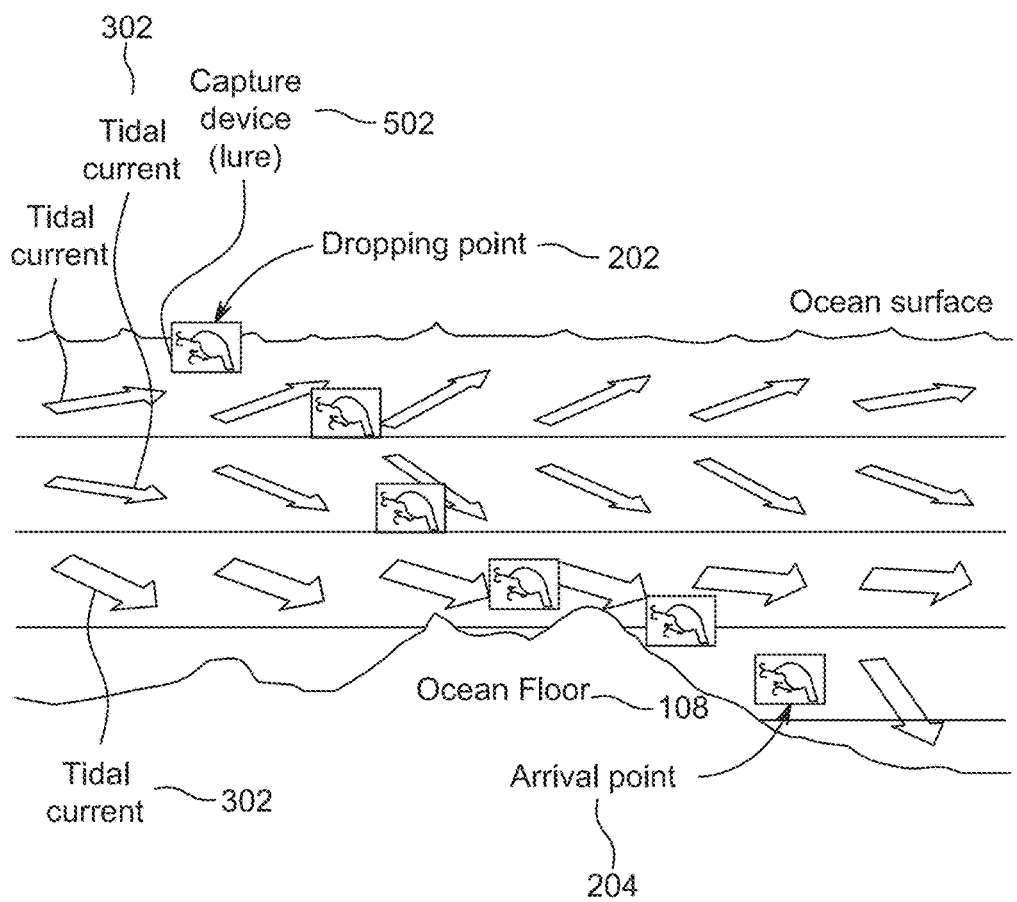
FIG. 9B is an image of the ocean and the multiple tidal current layers with the capture device, according to an embodiment of the present invention.

FIG. 9B is an image of the ocean and the multiple tidal current layers with the capture device 502, according to an embodiment of the present invention.

As per the first aspect of the present invention, the capture device 502 is dropped from the dropping point 202 based on the calculation obtained by the fish finder system 100. The harness is bent in the form of forces applied to the harness at different depth due to tidal current 302. Thus, an extra harness may be required to compensate the capture device 502 for reaching the arrival point 204.

The capture device 502 may be configured to transmit the position to the fish finder system 100 at every depth until the capture device 502 the reaches the arrival point 204.

Figure 10A:
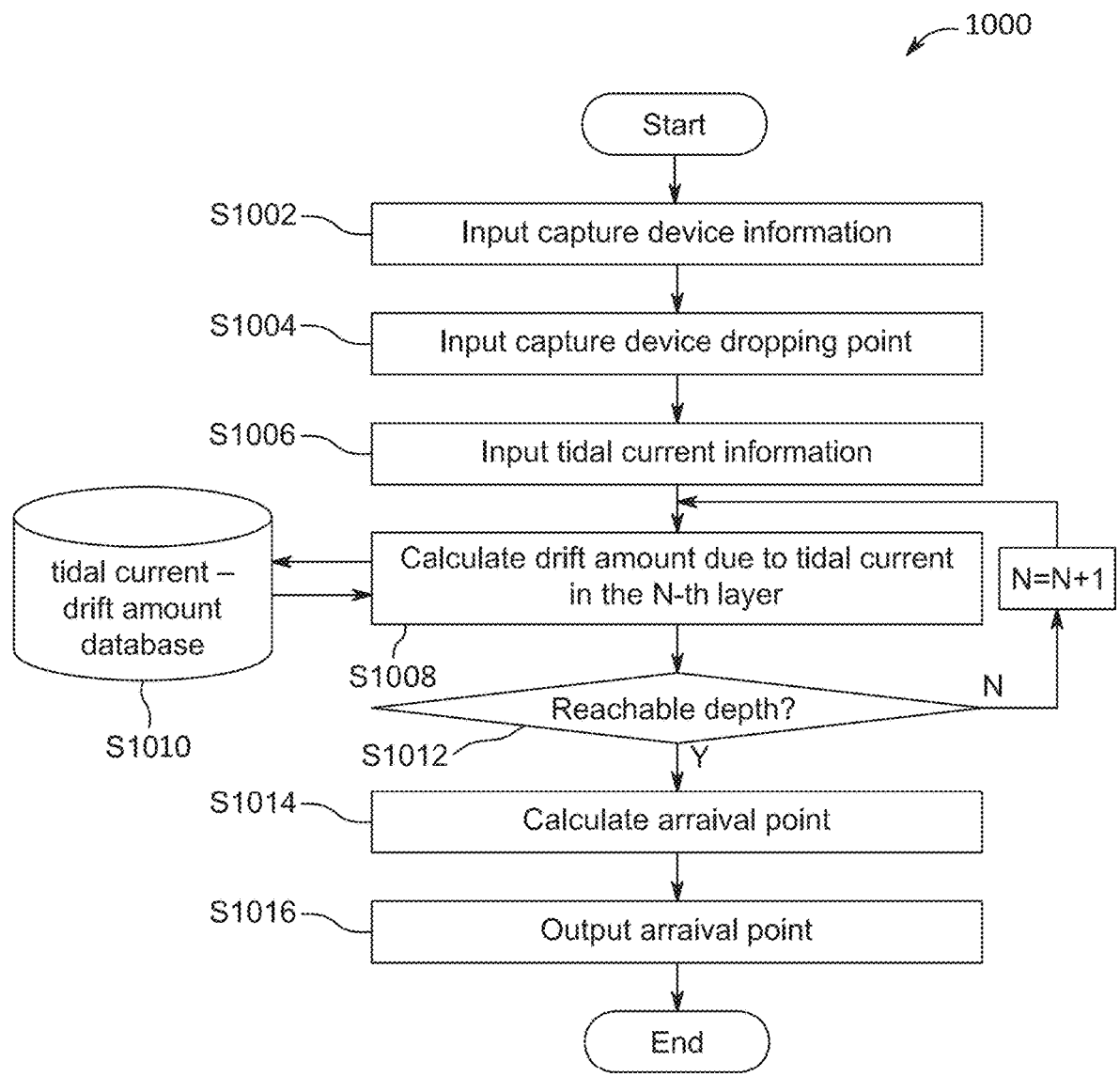
FIG. 10A is a flowchart of a method for calculating the arrival point in multiple tidal current layers, according to an embodiment of the present invention.

FIG. 10A is a flowchart of a method for finding the arrival point 204 in multiple tidal current layers by the fish finder system 100, according to an embodiment of the present invention.

Referring to FIG. 10A, the capture device information input terminal 402 may be configured to input the capture device information, at step S1002. For example, the size of the capture device 502 is entered as L*W*H as 70*70*32 centimeters (cm), the weight of the capture device 502 is entered as 206 grams and the fishing line length (L) as 10 meters.

Further, the dropping point 202 at which the capture device 502 is dropped from the water surface is input to the capture device dropping point input terminal 404, at step S1004. For example, the dropping point 202 entered by the user is 38.84° N, 135.00° E.

Further, the tidal current information including the tidal current 302 directions and the tidal current 302 speed is input to the tidal current information input terminal 406, at step S1006. For example, the tidal current 302 direction is entered as "south-west" and the speed is entered as 1.5 m/s.

Successively, the drift amount due to total current in the N-th layer of the capture device 502 is calculated relative to the dropping point 202, based at least on the capture device information and the tidal current information, at steps S1008. The tidal current information for the Nth layer is obtained from the information stored in the tidal current-drift amount database 802, at step S1010. For example, the drift amount of capture device 502 is calculated as 5 m/s in the $3^{rd}$ layer of the water.

Further, the fish finder system 100 may determine if the capture device 502 is reachable to the predetermined depth, at step S1012. In one case, if the capture device 502 is not reachable, then the method is redirected back to step S1008, to again calculate the drift amount to obtain the predetermined depth. For example, in case the drift amount 5 m/s is not enough to position the capture device 502 in proximity to a target location. The display device may show a message "Re-adjusting the capture device location".

In another case, if the capture device 502 is reachable, then the method may proceed to step S1014, to calculate the capture device arrival point at which the capture device arrives in the water, based on the dropping point 202 and the drift amount. For example, in case the capture device 502 is reachable, the display device may show a message "Target point reached" and the arrival point 204 may be calculated as 39.88° N, 135.70° E.

Successively, the calculated capture device arrival point is displayed on the display device, at step S1016. For example, the display device may show the arrival point 204 as "39.88° N, 135.70° E".

Further, the tidal current information input terminal 406 is configured to be inputted the tidal current information for each of multiple layers divided by water depth. The processing circuitry 408 is configured to calculate the drift amount for each layer, based on the capture device information and the tidal current information for the layer, and calculate the capture device arrival point, based on the dropping point 202 and the drift amounts.

For example, FIG. 10B shows the direction and velocity of the tidal current 402 for each area and depth in the vicinity of the ship 102 measured by the tidal current meter. This information is also stored in the database. For example, the ship 102 is now in Area 3 and the capture device 502 is dropped into the water surface from the ship 102. At this time, the tidal current 302 immediately below the water surface shall be N 5.8 m and W 1.3 m. The amount that the capture device 502 drifts while sinking 8 meters depends not only on the speed of the current but also on the size and weight of the capture device 502. The amount of drift in the size and weight of the capture device 502 is determined by checking against the information stored in the database. The capture device 502 drifts into Area 4 while sinking 8 m. The current in this area is N 7.1 m and W 0.7 m, as shown in FIG. 10B, which causes the capture device 502 to drift while it sinks. In this way, it may be determined how far the capture device 502 drifts to a depth where it may sink. The tidal current information may be obtained from a tidal current indicator(/meter) installed on the ship 102, or it may be obtained externally via wireless communications.

Figure 11:
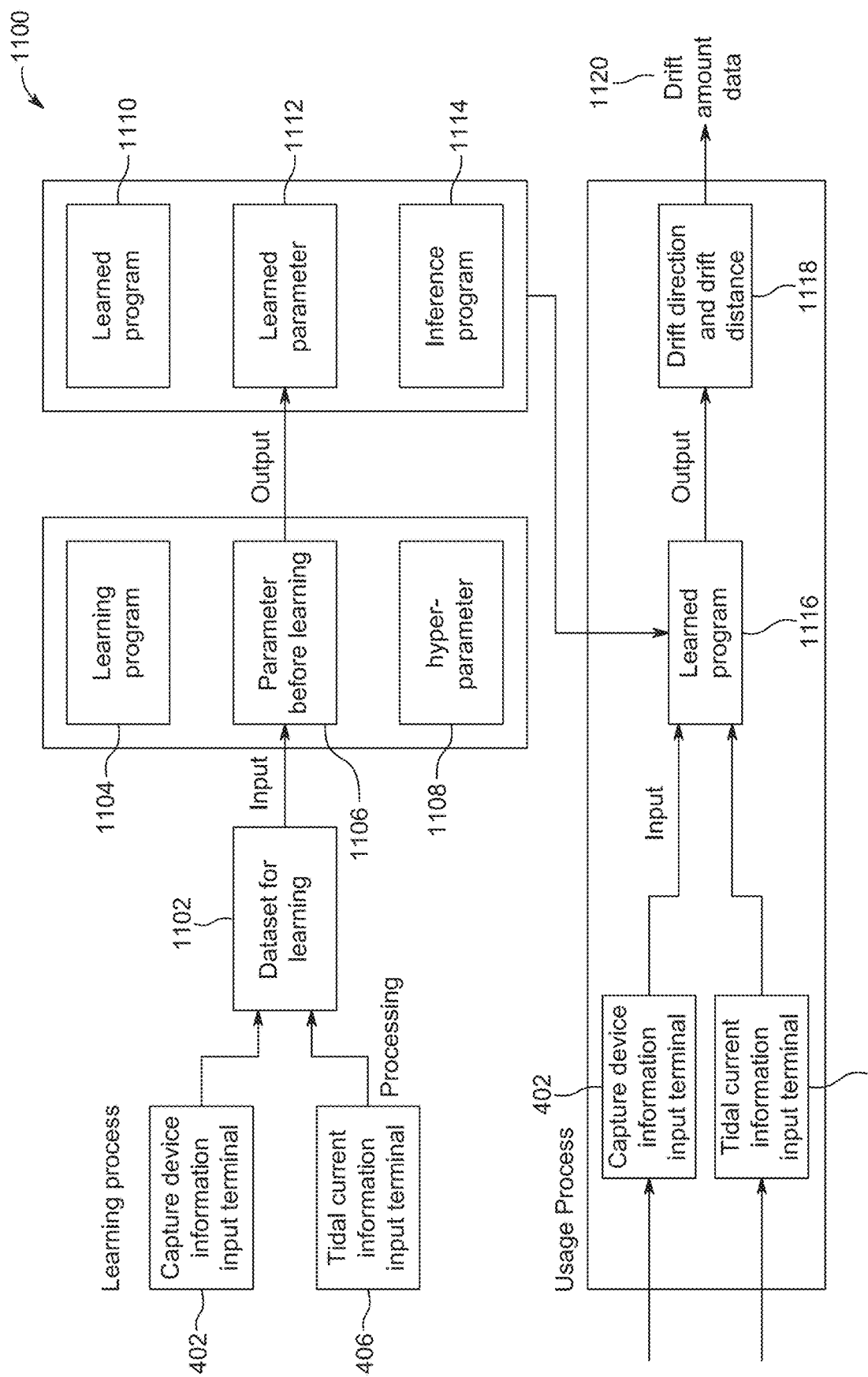
FIG. 11 is a block diagram of a machine learning assembly, according to an embodiment of the present invention.

FIG. 11 is a block diagram of a machine learning assembly 1100, according to an embodiment of the present invention.

The machine learning assembly 1100 may be configured to train a neural network for the drift output data by using actual values of the input data as a training data and configured to input the input data to the neural network by the machine learning assembly 1100 as a reference.

The capture device arrival point is calculated based at least on the dropping point 202 and the drift amount and output the capture device arrival point data 416. The machine learning assembly 1100 may comprise a learning process. The learning process comprises the capture device information input terminal 402 configured to input the capture device information and the tidal current input terminal 406 configured to input tidal current information including the tidal current 302 directions and the tidal current 302 speed. The capture device information, tidal current 302 directions and the tidal current 302 speed may transmit to a dataset 1102 for learning.

Further, the dataset for learning 1102 may be communicably coupled to a learning program 1104 for transmission of input data. The learning program 1104 provides a trainer/assessor with information about the competencies and suggestions for an assessment strategy. The learning program 1104 may be supervised or unsupervised. The learning program 1104 is configured to process the output data to a parameter before learning 1106. The parameter before learning 1106 is a configuration variable internal to a model and whose value may be estimated from data received from the learning program 1104. The parameter before learning 1106 is configured to transmit the output data to a hyper parameter 1108. The hyper parameter 1108 is a configured to process parameter to the model for the value that may not be estimated from data and send an output to a learned program 1110 of learning process.

The learned program 1110 may be supervised or unsupervised. Further, the learned program 1110 is configured to transmit the output data to a learned parameter 1112. The learned parameter 1112 provides the trained information about the competencies and suggestions for the assessment strategy. The learned parameter 1112 is a configuration variable internal to the model and whose value may be estimated from data received from the learned program 1110. The learned parameter 1112 is configured to transmit live data points into an interference program 1114 to calculate the learned output data.

Further, the machine learning assembly 1100 comprises a usage process. The usage process comprises the capture device information input terminal 402 configured to input the capture device information and the tidal current input terminal configured 406 to input tidal current information including the tidal current 302 directions and the tidal current 302 speed. The capture device information, tidal current 302 directions and the tidal current 302 speed may transmit to a learned program 1116 of usage process. The learned program 1116 of the usage process is configured to obtain a drift direction and drift distance 1118 as an output. Thus, the machine learning assembly 1100 is configured to provide a drift amount data 1120.

Figure 12:
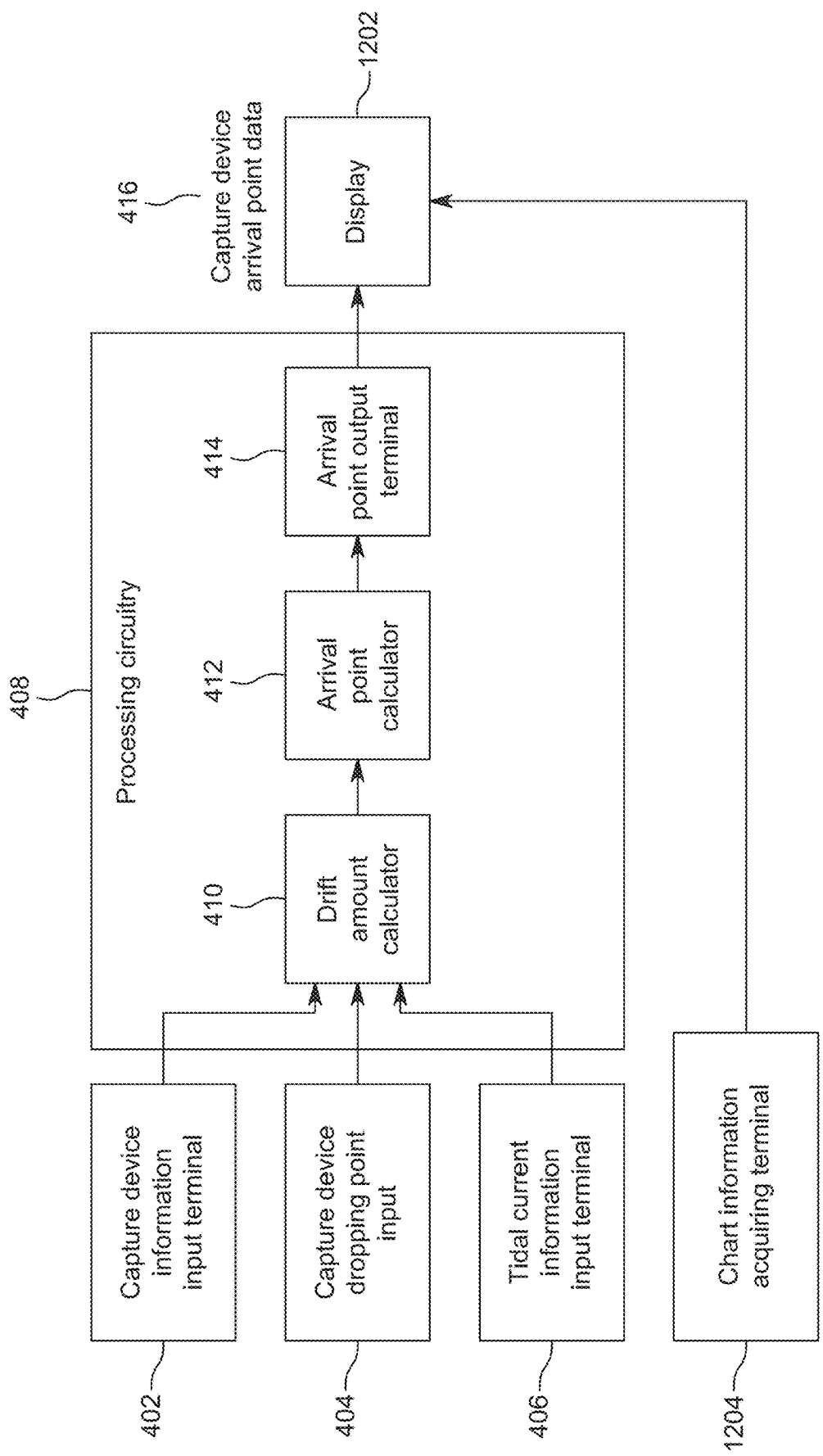
FIG. 12 is a block diagram for calculating the arrival point data and display on a display of the fish finder system, according to an embodiment of the present invention.

FIG. 12 is a block diagram for calculating the arrival point data and display on a display 1202, according to an embodiment of the present invention. FIG. 12 is described in conjunction with FIG. 4.

The display 1202 may correspond to the display device 200, as shown in FIG. 2. The capture device arrival point data 416 may be obtained and may be displayed on the display 1202. Further, the capture device arrival point data 416 may be displayed using a chart data from the chart information acquiring terminal 1204.

Figures 13A, 13B:
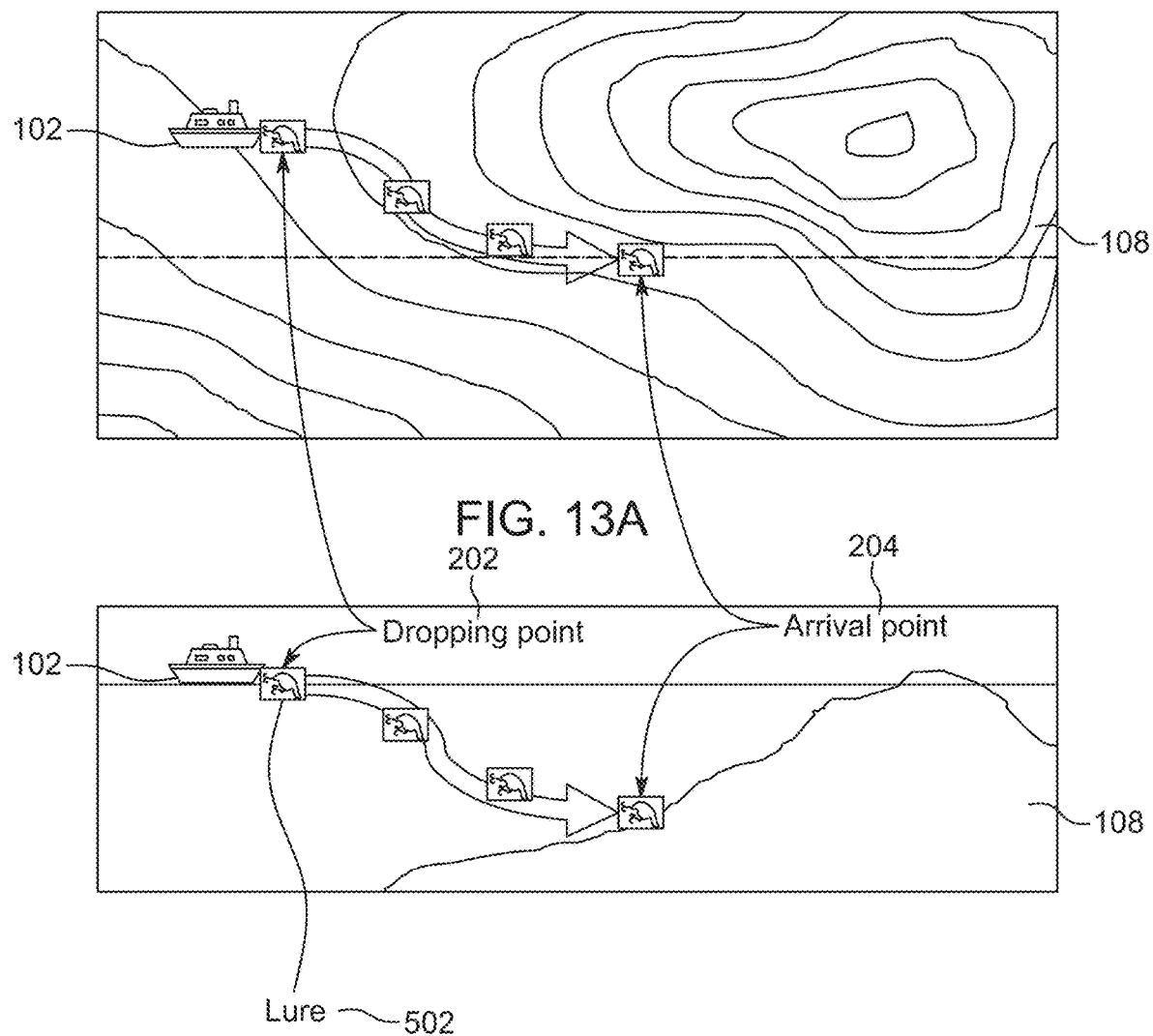
FIG. 13A is an image of the dropping point and the arrival point on the display device of the fish finder system, according to an embodiment of the present invention.
FIG. 13B is a close-up view of the image of the dropping point and the arrival point on the display device of the fish finder system, according to an embodiment of the present invention.

FIGS. 13A and 13B show images of the dropping point 202 and the arrival point 204 on the display device 200 of the fish finder system 100, according to an embodiment of the present invention.

The capture device arrival point is displayed on the display device 200 with respect to the dropping point 202. A user interface (not shown) of the display device 200 is configured to present visual interaction for selecting of the capture device 502 dropping point 202 and arrival point 204.

As such the user interface may display a graphical representation of the capture device 502 with respect to the ship 102. The graphical representation may comprise the fish school 104, the ocean floor 108 and the capture device 502 location. The user interface may receive the real time location of the capture device 502 from the ship 102 location. The user interface may provide a selection input to indicate the fish school 104 to be caught by any suitable gesture such as a touch, tap, hold, or drag input on the user interface.

Figure 14:
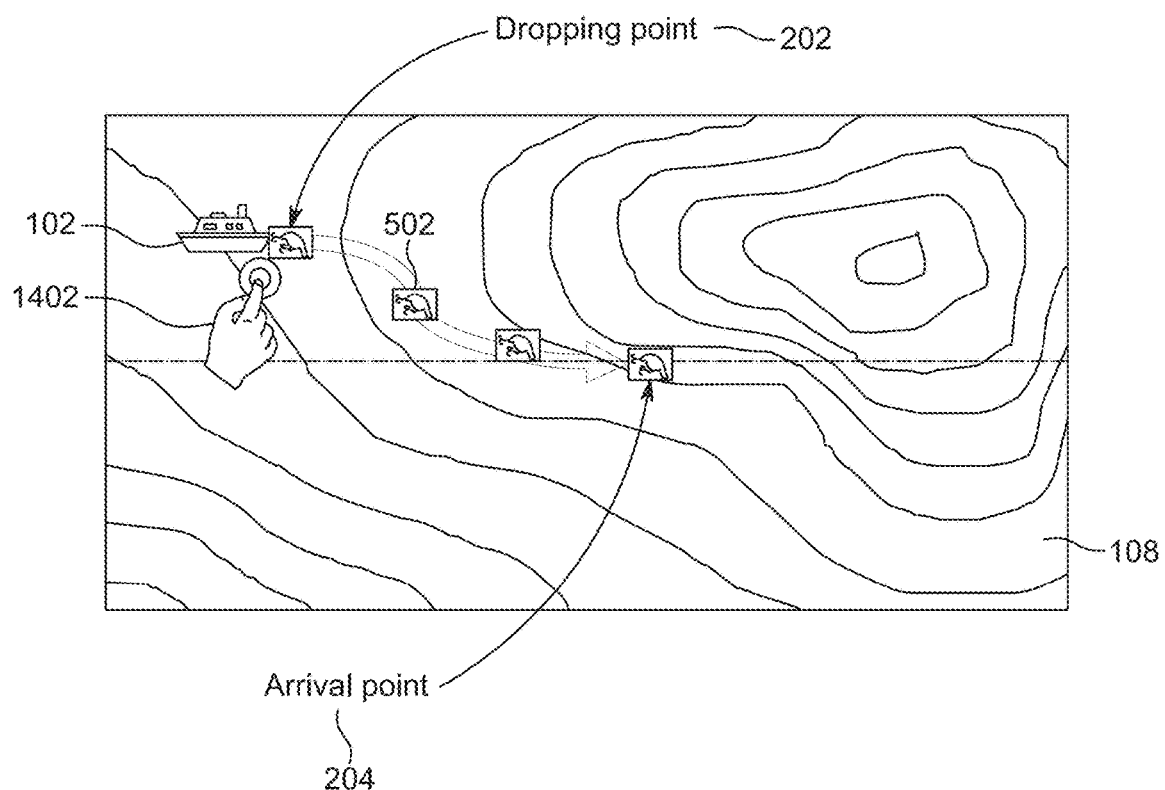
FIG. 14 is a touch panel for selection of a dropping point on the display device of the fish finder system, according to an embodiment of the present invention.

FIG. 14 is a touch panel for a selection of the dropping point 202 on the display device 200 of the fish finder system 100, according to an embodiment of the present invention.

The display device 200 may be provided with a user interface (not shown). The user interface may allow a user 1402 to select the dropping point 202 to obtain the arrival point 204. The user 1402 may provide a touch input on the user interface of the display device 200 to indicate that the capture device 502. The arrival point 204 of the capture device 502 may be calculated after the user 1402 touches the dropping point 202 on the user interface. It can be noted that the user interface may provide the graphical representation of the ship 102, the dropping point 202 and the arrival point 204 with respect to the ocean floor 108.

In some example embodiments, the user 1402 may provide the selection input through a non-touch gesture such as by using a mouse, keypad, button, or through a voice input.

Figure 15:
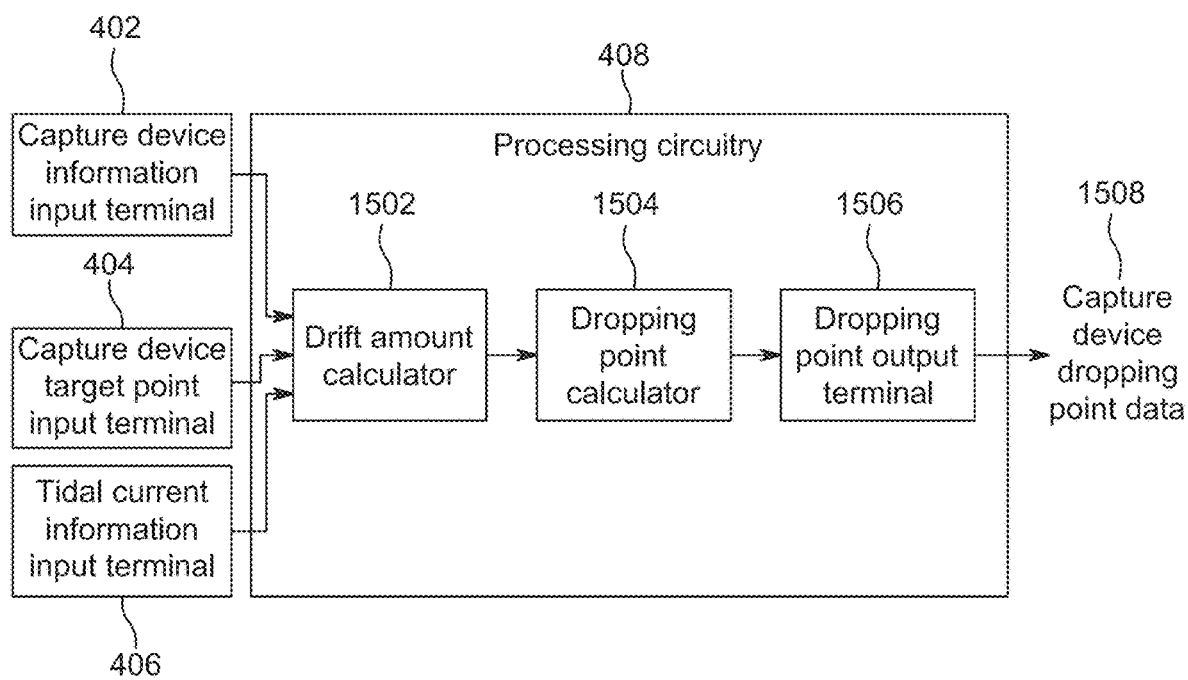
FIG. 15 is a block diagram for calculating a dropping point of the capture device, according to a second aspect of the present invention.

FIG. 15 is a block diagram for calculating the dropping point 202 of the capture device 502, according to a second aspect of the present invention.

A second aspect of present invention relates to the fish finder system 100 configured to calculate the dropping point 202 based on the target point 206 and drift amount. The fish finder system 100, according to the second aspect, is provided with the capture device information input terminal 402, the capture device dropping point input terminal 404, the tidal current information input terminal 408, and the processing circuitry 408.

The capture device information input terminal 402 is configured to input the capture device information.

The capture device target point input terminal configured to be inputted the target point 206 at which the capture device 502 is expected to reach in the water.

The tidal current information input terminal 406 configured to input tidal current information including the tidal current 302 directions and the tidal current 302 speed.

The area of the tidal current 302 includes the target point 206.

The processing circuitry 408 is configured to calculate a drift amount by a second drift amount calculator 1502 of the capture device 502 required to reach the dropping point 202, based on the capture device information and the tidal current information.

The capture device dropping point is calculated by a dropping point calculator 1504 at which the capture device 502 need to be dropped in the water at a dropping point output terminal 1506, based on the target point 206 and the required drift amount.

Thus, the capture device dropping point data 1508 may be obtained and may be displayed on the display device 200.

According to the second aspect, the capture device information includes the size of the capture device 502, the weight of the capture device 502, and the fishing line length (L) from the dropping point 202 to the tip of the fishing line to which the capture device 502 is attached in the water. The processing circuitry 408 is configured to calculate the drift amount for the dropping point 202, based on the size, weight of the capture device 502 and the tidal current information.

Figure 16A:
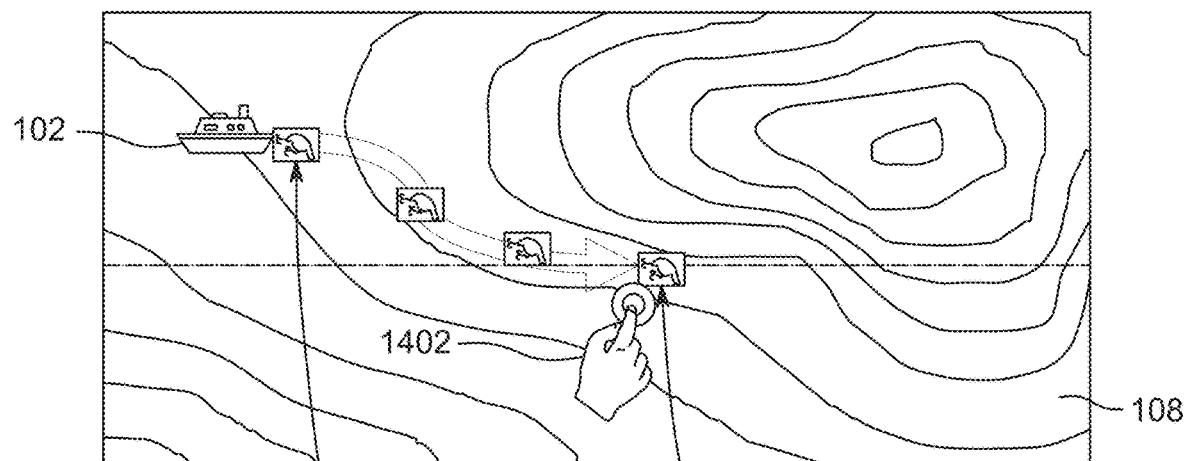
FIG. 16A is an image of the touch panel for selection of the target point on the display device of the fish finder system, according to the second aspect of the present invention.
Figure 16B:
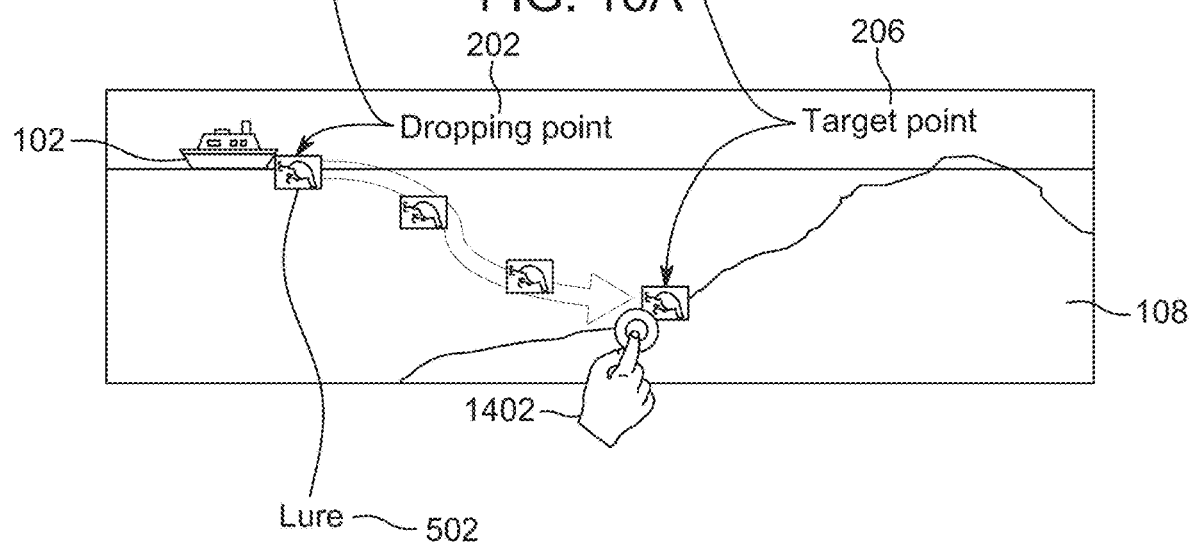
FIG. 16B is a close-up view of the touch panel for selection of a target point on the display device of the fish finder system, according to the second aspect of the present invention.

FIGS. 16A and 16B show images of the display device 200 for selection of the target point 206 on the display device 200 of the fish finder system 100, according to the second aspect of the present invention.

The user 1402 may provide an option to select the target point 206 to obtain the dropping point 202. The display device 200 is configured to display the chart on a screen that may superimpose the dropping point 202 at the corresponding position on the chart.

In some example embodiments, the user 1402 may provide the selection input through a non-touch gesture such as by using a mouse, keypad, button, or through a voice input.

Figure 17:
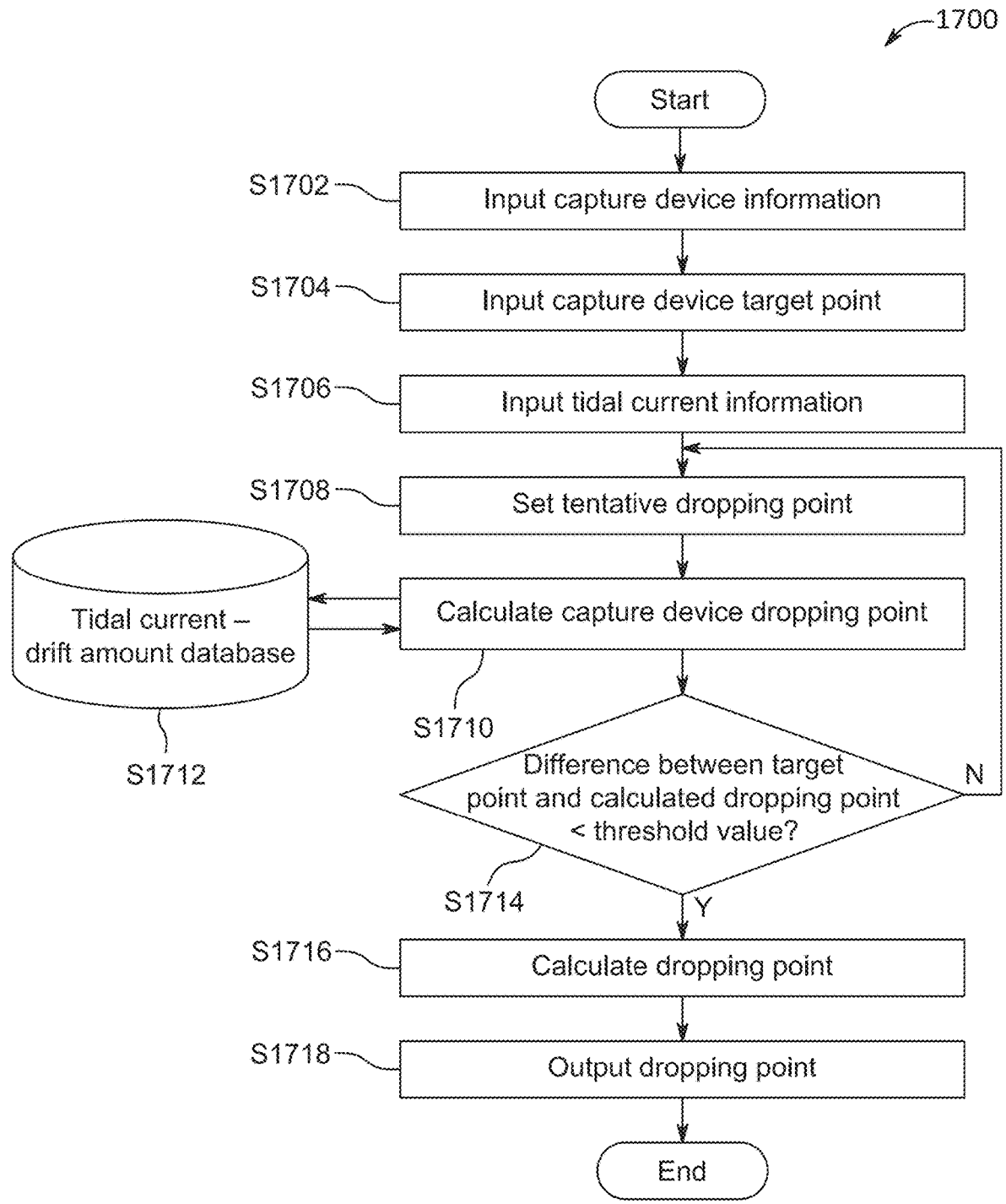
FIG. 17 is a flowchart of a method for calculating the dropping point of the capture device, according to the second aspect of the present invention.

FIG. 17 is a flowchart of a method 1700 for calculating the dropping point 202 in multiple tidal current 302 layers of the fish finder system 100, according to the second aspect of the present invention.

Referring to FIG. 17, the capture device information input terminal 402 may be configured to input a capture device information, at step S1702. For example, the capture device information input terminal 402 may be entered with size of the capture device 502 is entered as L*W*H as 70*70*32 centimeters (cm), the weight of the capture device 502 is entered as 206 grams and the fishing line length (L) as 10 meters.

Further, the target point 206 at which the capture device 602 is needed to reach from the water surface is input, at step S1704. For example, the target point as input is given as 39.88° N, 135.70° E.

Further, the tidal current information including the tidal current 302 directions and the tidal current 302 speed is input to the tidal current information input terminal 406, at step S1706. For example, the tidal current 302 direction is entered as "south-west" and the speed is entered as 1.5 m/s.

Further, a tentative dropping point 202 is set based on the tidal current information, at step S1708. For example, the dropping point 202 set is 38.84° N, 135.00° E.

Further, the drift amount due to total current in the Nth layer of the capture device 502 relative to the target point 206 is calculated, based on the capture device information and the tidal current information, at step S1710. For example, the drift amount of capture device 502 is calculated as 5 m/s.

It can be noted that the tidal current information for the Nth layer is obtained from the information stored in the tidal current-drift amount database 802, at step S1712. For example, the tidal current 302 direction is entered as "south-west" and the speed is entered as 1.5 m/s for the $3^{rd}$ layer.

Further, determine whether the difference between the target point 206 and the calculated dropping point 202 is less than a threshold value, at step S1714. The threshold value may be a difference value between the arrival point 204 and the target point 206.

In one case, if the difference between the target point 206 and the calculated dropping point 202 is not less than the threshold value, then the dropping point 202 is again set at step S1708. For example, the difference between the target point 206 and the calculated dropping point 202 is 3 meters approximately and the threshold value is 2.5 meters.

In another case, if the difference between the target point 206 and the calculated dropping point 202 is less than the threshold value, then the method may proceed to step S1716 to calculate the dropping point. For example, the difference between the target point 206 and the calculated dropping point 202 is 2 meters approximately and the threshold value is 2.5 meters.

Successively, the calculated dropping point 202 is output to the display device 200, at step S1718. For example, the calculated dropping point 202 of the capture device 502 is 40.84° N, 131.00° E.

The above embodiments are exemplary in all respects and are not restrictive. The scope of the invention is set forth in the claims, not in the above description, and includes the meaning of and all variations within the scope of the claims.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this invention. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiment disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey those certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface". The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, movable, fixed, adjustable, and/or releasable connections or attachments. The connections/attachments can include direct connections and/or connections having intermediate structure between the two components discussed.

Unless otherwise explicitly stated, numbers preceded by a term such as "approximately", "about", and "substantially" as used herein include the recited numbers, and also represent an amount close to the stated amount that still performs a desired function or achieves a desired result. For example, unless otherwise explicitly stated, the terms "approximately", "about", and "substantially" may refer to an amount that is within less than 10% of the stated amount. Features of embodiments disclosed herein preceded by a term such as "approximately", "about", and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this invention and protected by the following claims.

What is claimed is:

1. A fish finder system, comprising:
   a capture device information input terminal configured to input a capture device information;
   a capture device dropping point input terminal configured to input a dropping point at which a capture device is dropped from a water surface;
   a tidal current input terminal configured to input tidal current information including a tidal current direction and a tidal current speed, wherein area of the tidal current includes the dropping point; and
   processing circuitry communicatively coupled to the capture device information input terminal, the capture device dropping point input terminal, and the tidal current input terminal, and configured to:
      calculate a drift amount of the capture device relative to the dropping point, based at least on the capture device information and the tidal current information;
      calculate a capture device arrival point at which the capture device arrives in the water, based at least on the dropping point and the drift amount; and
      output data related to the capture device arrival point, wherein
   the capture device information includes a size of the capture device, a weight of the capture device, and a fishing line length from the dropping point to a tip of a fishing line to which the capture device is attached, in the water, and
   the processing circuitry is further configured to calculate the drift amount within reach of the tip, based at least on the size of the capture device, the weight of the capture device, and the tidal current information.

2. The fish finder system of claim 1, wherein
   the tidal current information input terminal is configured to input the tidal current information for each of multiple layers divided by water depth; and
   the processing circuitry is configured to:
      calculate the drift amount for each layer, based at least on the capture device information and the tidal current information for each layer; and
      calculate the capture device arrival point, based at least on the dropping point and the drift amounts.

3. The fish finder system of claim 2, wherein the processing circuitry includes a database that stores the drift amount by which the capture device drifts in accordance with the tidal current information, size and weight of the capture device, while the capture device sinks to a predetermined depth.

4. The fish finder system of claim 3, wherein the processing circuitry is configured to determine the drift amount for each layer, by the capture device information and the tidal current information for the layer with the information stored in the database.

5. The fish finder system of claim 1, further comprising
   a chart information acquiring terminal configured to acquire a chart data; and
   a display device configured to:
      display a chart on a screen; and
      superimpose the capture device arrival point at a corresponding position on the chart.

6. The fish finder system of claim 5, wherein the chart data corresponds to three-dimensional positions and is converted into two-dimensional coordinates to display onto the screen.

7. The fish finder system of claim 5, wherein
   the screen is a touch panel type screen, and
   the position of the dropping point is entered by touching the corresponding position on the displayed chart.

8. The fish finder system of claim 1, wherein
   the capture device includes at least one of fishing tackle, a fishing needle, or a lure.

9. The fish finder system of claim 1, wherein
   the processing circuitry is further configured to:
      input a drift data including a direction and a distance of an actual arrival point of the capture device relative to the dropping point.

10. The fish finder system of claim 9, wherein the processing circuitry includes an arrival point calculator having
    a neural network with the capture device information, the dropping point, and the tidal current information, as an input data, and a result of drift amount of the capture device as a drift output data; and
    a machine learning assembly configured to train the neural network for the drift output data by using actual values of the input data as a training data, and configured to:
       enter the input data to the neural network learned by the machine learning assembly as a reference;
       calculate the capture device arrival point based at least on the dropping point and the drift amount; and
       output the capture device arrival point data.

11. A fish finder system, comprising:
    a capture device information input terminal configured to input a capture device information;
    a capture device target point input terminal configured to input a target point at which a capture device is expected to reach in water;
    a tidal current input terminal configured to input tidal current information including a tidal current direction and a tidal current speed, wherein area of the tidal current includes the target point; and
    processing circuitry communicatively coupled to the capture device information input terminal, the capture device target point input terminal, and the tidal current input terminal, and configured to:
       calculate a drift amount of the capture device required to reach a target point, based at least on the capture device information and the tidal current information;

calculate a capture device dropping point at which the capture device drops on the water surface, to reach the target point, based at least on the target point and the calculated drift amount; and output data related to the capture device dropping point, wherein the capture device information includes a size of the capture device, a weight of the capture device, and a fishing line length from the target point to the dropping point; and the processing circuitry is further configured to calculate the drift amount of the capture device required to reach the target point, based at least on the size of the capture device, the weight of the capture device, and the tidal current information.

12. The fish finder system of claim 11, wherein
the tidal current information input terminal is configured to input the tidal current information for each of multiple layers divided by water depth; and
the processing circuitry is configured to:
calculate the drift amount for each layer, based at least on the capture device information and the tidal current information for each layer; and
calculate the capture device dropping point, based at least on the target point and the drift amounts.

13. The fish finder system of claim 12, wherein the processing circuitry includes a database that stores the drift amount by which the capture device drifts in accordance with the tidal current information, size and weight of the capture device, while the capture device sinks to the target point.

14. The fish finder system of claim 13, wherein the processing circuitry is configured to determine the drift amount for each layer, by the capture device information and the tidal current information for the layer with the information stored in the database.

15. The fish finder system of claim 11, further comprising
a chart information acquiring terminal configured to acquire a chart data; and
a display device configured to:
display a chart on a screen from the chart data; and
superimpose the capture device dropping point at a corresponding position on the chart.

16. The fish finder system of claim 11, wherein
the processing circuitry is further configured to:
input a drift data including a direction and a distance of an actual target point of the capture device,
and further includes to calculate capture device dropping point having
a neural network having the capture device information, the target point and the tidal current information as an input data, and a result of drift amount of the capture device as a reference as a drift output data; and
a machine learning assembly configured to train the neural network for the drift output data by using actual values of the input data as a training data, and
configured to:
enter the input data to the neural network learned by the machine learning assembly as a reference;
calculate the capture device dropping point based on the target point and the drift amount; and
output the capture device dropping point data.

17. A non-transitory computer readable medium storing instruction, that when executed by processing circuitry, cause a computer system to perform a method that comprises:
receiving a capture device information including a size and a weight of a capture device;
receiving a dropping point at which a capture device is dropped into the water surface;
receiving tidal current information including a tidal current direction and a tidal current speed, wherein area of the tidal current includes the dropping point;
calculating a drift amount related to the dropping point, based at least on the capture device information and the tidal current information;
calculating a capture device arrival point at which the capture device arrives in the water, based at least on the dropping point and the drift amount; and
outputting data related to the capture device arrival point.

18. A non-transitory computer readable medium storing instruction that, when executed by processing circuitry, cause a computer system to perform a method that comprises:
receiving a target point on a chart and its depth from a water surface;
receiving capture device information including a size and a weight of a capture device;
receiving tidal current information including a tidal current direction and a tidal current speed, wherein area of the tidal current includes the target point;
calculating a drift amount of the capture device required to reach the target point, based at least on the capture device information and the tidal current information;
calculating the dropping point of the water surface of the capture device to reach the target point, based at least on the target point and the calculated drift amount, and
output data related to the capture device dropping point.

19. A fish finder system, comprising:
a capture device information input terminal configured to input a capture device information;
a capture device dropping point input terminal configured to input a dropping point at which a capture device is dropped from a water surface;
a tidal current input terminal configured to input tidal current information including a tidal current direction and a tidal current speed, wherein area of the tidal current includes the dropping point;
processing circuitry communicatively coupled to the capture device information input terminal, the capture device dropping point input terminal, and the tidal current input terminal, and configured to:
calculate a drift amount of the capture device relative to the dropping point, based at least on the capture device information and the tidal current information;
calculate a capture device arrival point at which the capture device arrives in the water, based at least on the dropping point and the drift amount; and
output data related to the capture device arrival point;
a chart information acquiring terminal configured to acquire a chart data; and
a display device configured to:
display a chart on a screen; and
superimpose the capture device arrival point at a corresponding position on the chart, wherein
the screen is a touch panel type screen, and
the position of the dropping point is entered by touching the corresponding position on the displayed chart.

20. The fish finder system of claim 19, wherein the chart data corresponds to three-dimensional positions and is converted into two-dimensional coordinates to display onto the screen.

21. A fish finder system, comprising:
- a capture device information input terminal configured to input a capture device information;
- a capture device dropping point input terminal configured to input a dropping point at which a capture device is dropped from a water surface;
- a tidal current input terminal configured to input tidal current information including a tidal current direction and a tidal current speed, wherein area of the tidal current includes the dropping point; and
- processing circuitry communicatively coupled to the capture device information input terminal, the capture device dropping point input terminal, and the tidal current input terminal, and configured to:
  - calculate a drift amount of the capture device relative to the dropping point, based at least on the capture device information and the tidal current information;
  - calculate a capture device arrival point at which the capture device arrives in the water, based at least on the dropping point and the drift amount;
  - output data related to the capture device arrival point; and
  - input a drift data including a direction and a distance of an actual arrival point of the capture device relative to the dropping point, wherein
- the processing circuitry includes an arrival point calculator having:
  - a neural network with the capture device information, the dropping point, and the tidal current information, as an input data, and a result of drift amount of the capture device as a drift output data; and
  - a machine learning assembly configured to train the neural network for the drift output data by using actual values of the input data as a training data, and configured to:
  - enter the input data to the neural network learned by the machine learning assembly as a reference;
  - calculate the capture device arrival point based at least on the dropping point and the drift amount; and
  - output the capture device arrival point data.

* * * * *